US012189627B2

(12) United States Patent
Beavin et al.

(10) Patent No.: US 12,189,627 B2
(45) Date of Patent: Jan. 7, 2025

(54) QUERY OPTIMIZATION USING REINFORCEMENT LEARNING

(71) Applicant: International Business Machines Corporation, Armonk, NY (US)

(72) Inventors: Thomas A. Beavin, Milpitas, CA (US); Shuanglin Guo, Cupertino (CN); Brandon Jabr, Los Altos, CA (US); Terence P. Purcell, Springfield, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 206 days.

(21) Appl. No.: 17/931,588

(22) Filed: Sep. 13, 2022

(65) Prior Publication Data
US 2023/0401207 A1 Dec. 14, 2023

Related U.S. Application Data

(60) Provisional application No. 63/366,070, filed on Jun. 9, 2022.

(51) Int. Cl.
G06F 16/2453 (2019.01)
(52) U.S. Cl.
CPC .............. G06F 16/24542 (2019.01)
(58) Field of Classification Search
None
See application file for complete search history.

(56) References Cited

U.S. PATENT DOCUMENTS

| 6,763,359 | B2 | 7/2004 | Lohman et al. |
| 7,610,264 | B2 | 10/2009 | Ewen et al. |
| 8,788,660 | B2 | 7/2014 | Barsness et al. |
| 11,531,657 | B1* | 12/2022 | Sankaran ............... G06N 20/00 |
| 2009/0271360 | A1 | 10/2009 | Bestgen et al. |
| 2013/0013586 | A1 | 1/2013 | Muras et al. |
| 2019/0354621 | A1* | 11/2019 | Wang .................. G06F 16/2453 |
| 2021/0133193 | A1 | 5/2021 | Mcconnell |

(Continued)

FOREIGN PATENT DOCUMENTS

| CN | 111444220 A | 7/2020 |
| CN | 112988802 A | 7/2022 |
| GB | 2478016 A | 8/2011 |

OTHER PUBLICATIONS

Marcus, Ryan & Olga Papaemmanouil, "Deep Reinforcement Learning for Join Order Enumeration", ACM 'aiDM '18, Jun. 2018, 4 pages. (Year: 2018).*

Primary Examiner — Scott A. Waldron
(74) Attorney, Agent, or Firm — Cantor Colburn LLP; Teddi Maranzano

(57) ABSTRACT

According to an aspect, a computer-implemented method for improving query performance in a databased management system (DBMS) includes receiving, by a query optimizer of the DMBS, a query for execution. The method also includes creating, by the query optimizer, an initial access path for the query based on state and executing the query based on the initial access path. The method further includes observing, by a query agent of the DBMS, the execution of the query and modifying at least one of the state based on a determination by the query agent that a change to the initial access path would improve the execution of the query.

15 Claims, 5 Drawing Sheets

(56) References Cited

U.S. PATENT DOCUMENTS

| 2022/0067046 A1* | 3/2022 | Katroulis | G06F 11/3419 |
| 2023/0177053 A1* | 6/2023 | Interlandi | G06F 16/24545 |
| | | | 707/713 |
| 2023/0315702 A1* | 10/2023 | Wu | G06F 16/2453 |
| | | | 707/713 |

* cited by examiner

QUERY OPTIMIZATION USING REINFORCEMENT LEARNING

BACKGROUND

The present invention generally relates to query optimization, and more specifically, to query optimization using reinforcement learning.

Within a database management system (DBMS), query performance is dependent on having good query optimization. For decades, cost-based query optimization has been considered the gold standard for achieving the best query performance. A cost-based query optimizer contains logic to loop through a number of candidate access paths, and a cost model that can estimate the cost of each of those candidate access paths. The access path with the lowest estimated cost is the one selected by the cost-based query optimizer.

The challenge that all cost-based query optimizers face is that an accurate cost model requires a very large number of inputs, and these inputs must be accurate. For example, a cost-based query optimizer is dependent on accurate filter factor estimation for each predicate in the query. A single query can contain 100's of predicates, requiring 100's of inputs to the optimizer. In addition, the cost-based query optimizer might require input about predicate combinations, which leads to many, many more possible inputs that need to be supplied. Joins, host variables, functions, and aggregation; these all introduce additional complexity to the query and to the cost model, which leads to an ever-increasing number of inputs as the query optimizer attempts to model this complexity.

The result is that in many, many cases, there are many inputs to the cost-based optimizer that are not supplied and therefore these inputs have a default value, which is often just a fixed arbitrary value (like 25, or 50%), or a default assumption, like the independence of predicates or the uniform distribution of data values. In addition, the values that are supplied are often stale values and are no longer accurate.

SUMMARY

Embodiments of the present invention are directed to improving query performance in a databased management system (DBMS). According to an aspect, a computer-implemented method includes receiving, by a query optimizer of the DMBS, a query for execution. The method also includes creating, by the query optimizer, an initial access path for the query based on state and executing the query based on the initial access path. The method further includes observing, by a query agent of the DBMS, the execution of the query and modifying at least one of the state based on a determination by the query agent that a change to the initial access path would improve the execution of the query.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
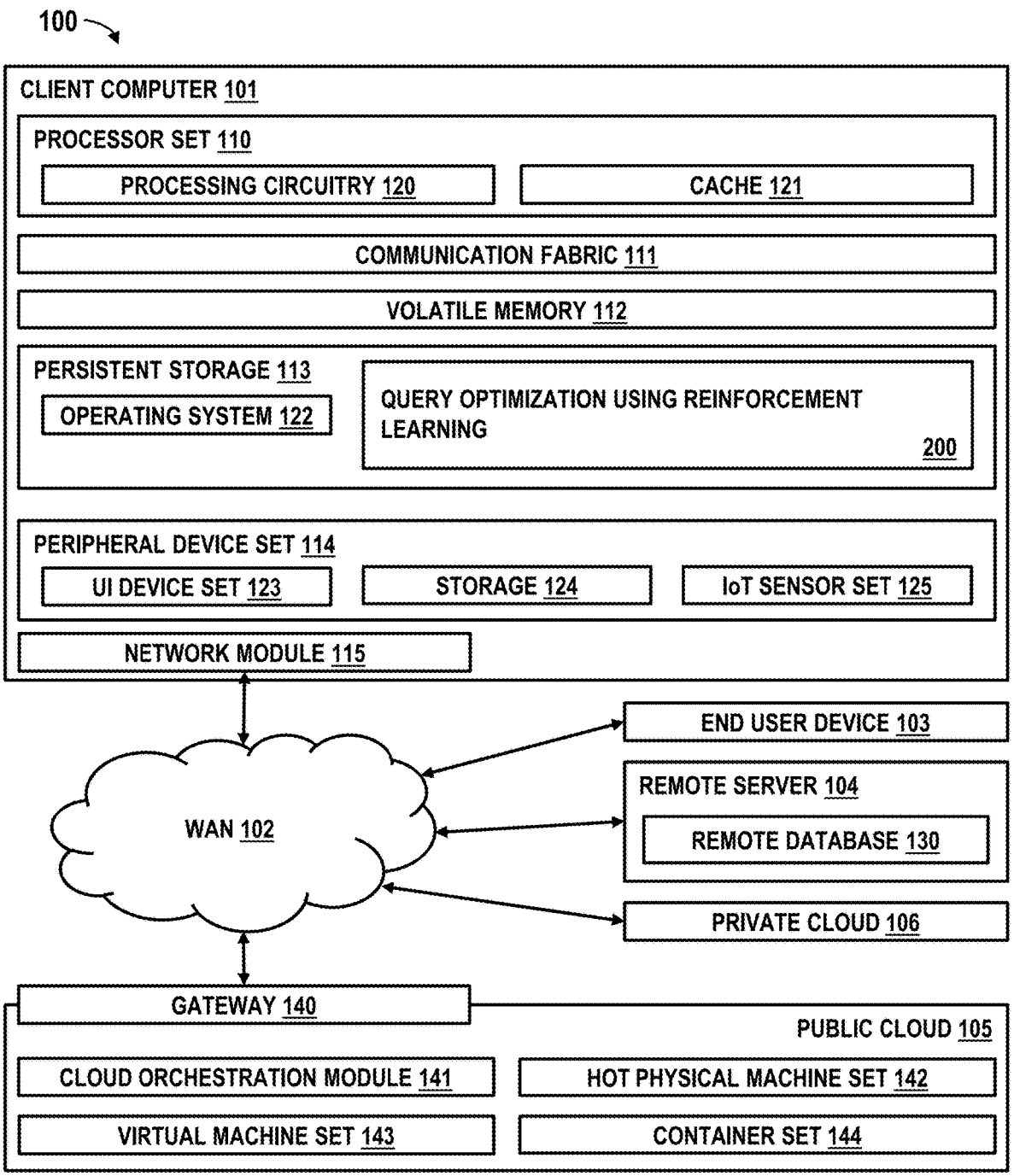
FIG. 1 depicts a block diagram of an example computer system for use in conjunction with one or more embodiments of the present invention.

As discussed above, cost-based query optimizers require a very large number of inputs, and these inputs must be accurate and in many, many cases, there are many inputs to the cost-based optimizer that are not available or accurate. As a result, the queries performed using cost-based query optimizers are often executed in a suboptimal manner.

Embodiments address the shortcomings of the current systems by applying reinforcement learning (RL) to query optimization to achieve improved query performance without having to know the inputs to a cost-based query optimizer. In exemplary embodiments, the RL process is performed by a query agent that provides feedback to the query optimizer (which can be cost-based or rule-based). In one embodiment, the query optimizer receives a query and determines an initial access path based on a state, wherein the state is a set of one or more inputs or assumptions. The initial access path is the best query execution plan that the query optimizer can determine based on the state, i.e., the initial or current set of inputs or assumptions. During the execution of the query according to the initial access path, the query agent obverses the execution and determines if changes to the state would result in improved execution of the query. If so, the query agent instructs the query optimizer to update the state. In exemplary embodiments, this process incrementally advances toward the optimal access path for the query.

One portion of the RL process, which distinguishes it from randomly mutating the selected access path until it finally mutates into the optimal access path, is the query agent that is configured to observe the execution of the query, and then based on how that execution behaved with regard to the state (the current access path), the query agent will suggest a modification to the current access path, or to one of the sets of assumptions/inputs used to create the current access path, which results in a new "state" for the next iteration of the RL process. In exemplary embodiments, the query optimizer is able to start with the best access path which the query optimizer can produce, and then the query agent evaluates the actual execution of the query to improve the access path in a step-by-step manner until it reaches the goal of executing the optimal access path for that query.

In one embodiment, the RL process is an automated process. There is no need for human intervention to assist with any of the decisions to be made, or to assist with driving the process forward. The process is driven forward by the natural execution of the query. Each execution of the query results in the RL process determining what the next action should be (if any).

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as the provisioning of variable sized virtual functions in a network interface card 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future.

Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both parts of a larger hybrid cloud.

Figure 2:
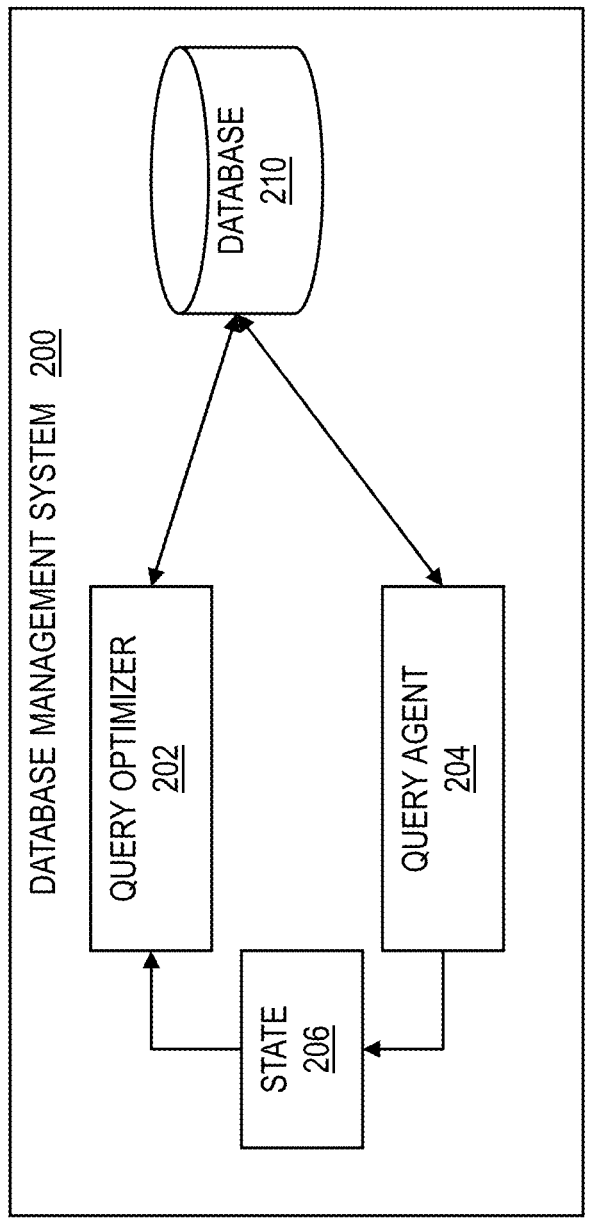
FIG. 2 is a block diagram of a database management system for use in conjunction with one or more embodiments of the present invention.

Referring now to FIG. 2 is a block diagram of a database management system (DBMS) 200 for use in conjunction with one or more embodiments of the present invention. In exemplary embodiments, the DMBS 200 is embodied in a computing system 101, such as the one shown in FIG. 1. As illustrated, the DBMS 200 includes a query optimizer 202, a query agent 204, a state 206, and a database 210. In exemplary embodiments, the query optimizer 202 is configured to receive a query for database 210. In response to the received query, the query optimizer 202 determines an execution plan, referred to herein as an access path, for the query based on the state 206. In exemplary embodiments, the state 206 includes one or more inputs and assumptions regarding the database 210 that are used to determine the access path.

In exemplary embodiments, the query agent 204 is configured to observe the execution of the query based on the access path created by the query optimizer 202. In addition, the query agent 204 is configured to determine whether changes to the access path used for the query would have resulted in an increase in the performance of the query. Based on the query agent 204 determining that another access path would have resulted in an increase in the performance of the query, the query agent 204 updates the state 206. In one embodiment, the query agent 204 determines that another access path would have resulted in an increase in the performance of the query by performing the query using a different access path, and the changes to the state 206 are based on the differences between the access path used by the query agent 204 and the query optimizer 202.

Figure 3:
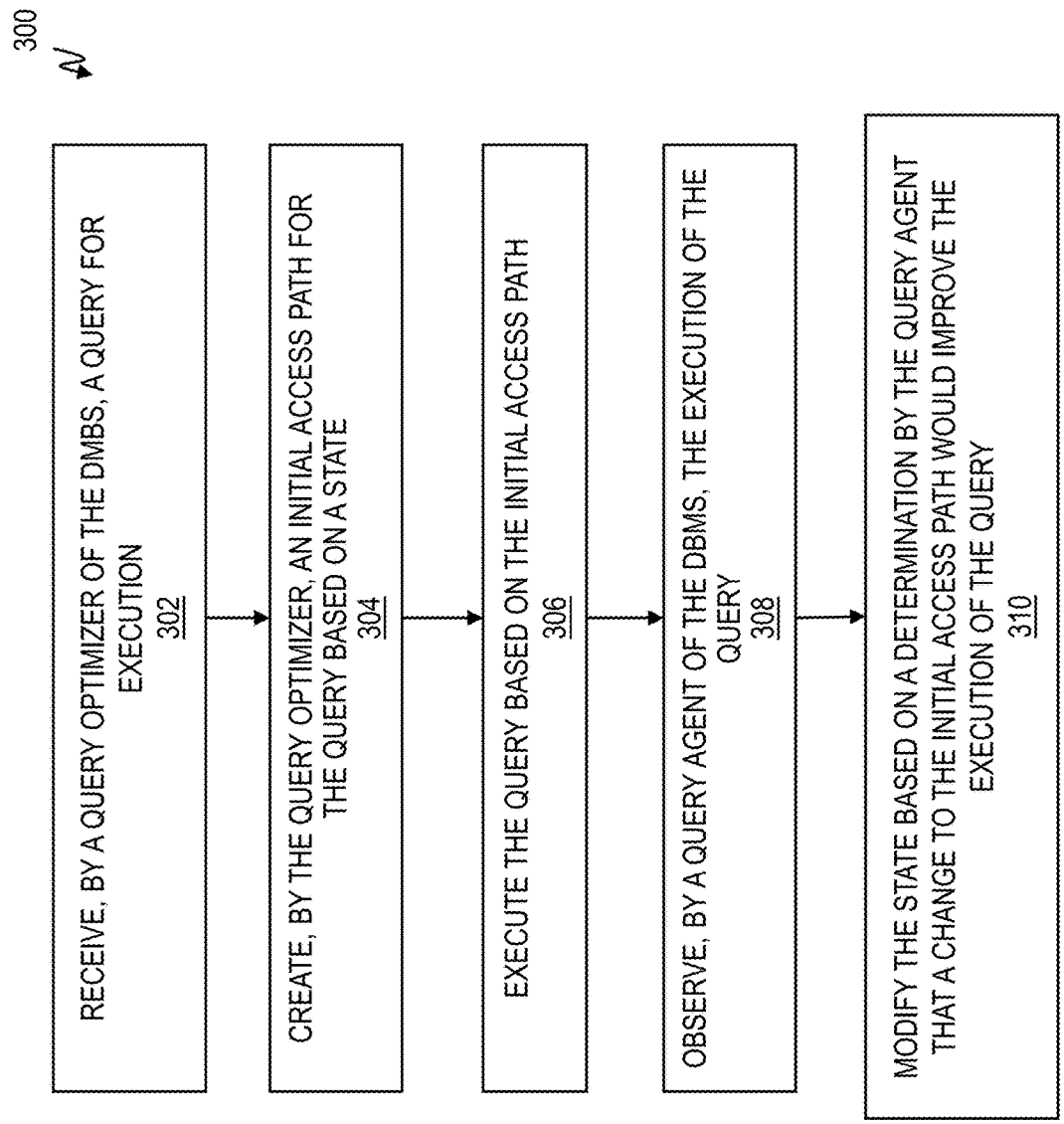
FIG. 3 is a flowchart of a method for performing query optimization by applying reinforcement learning in accordance with one or more embodiments of the present invention.

FIG. 3 is a flowchart of a method 300 for performing query optimization by applying reinforcement learning (RL) in accordance with one or more embodiments of the present invention is shown. As illustrated at block 302, the method 300 includes receiving, by a query optimizer of the DMBS, a query for execution. Next, as shown at block 304, the method 300 includes creating, by the query optimizer, an initial access path for the query based on a state. In exemplary embodiments, the initial access path is the optimal query execution plan based on the state, wherein the state is a set of assumptions regarding a database of the DBMS.

Next, as shown at block 306, the method 300 includes executing the query based on the initial access path. The method 300 further includes observing, by a query agent of the DBMS, the execution of the query, as shown at block 308. The method 300 includes modifying the state based on a determination by the query agent that a change to the initial access path would improve the execution of the query. In exemplary embodiments, modifying the state causes the query optimizer to create an access path different from the initial access path for subsequent execution of the query.

In one embodiment, the determination by the query agent that the change to the initial access path would improve the execution of the query is based on the query agent performing the query according to a second access path that is different from the first access path. In this embodiment, the modifications to the state are determined based on the second access path. In exemplary embodiments, determining by the query agent that the change to the initial access path would improve the execution of the query is based on includes calculating an improvement score based on a difference between the execution of the query based on the initial access path and the execution of the query based on the second access path.

In exemplary embodiments, when the query optimizer receives a second query for execution, the query optimizer creates an access path for the second query based on the modified state. Likewise, the query agent observes the execution of the second query and based on a determination by the query agent that a change to the access path would improve the execution of the second query, the query agent further modifies the state. This iterative process continues to further refine and improve the operation of the query optimizer and to account for potential changes to the structure of the database overtime.

Figure 4:
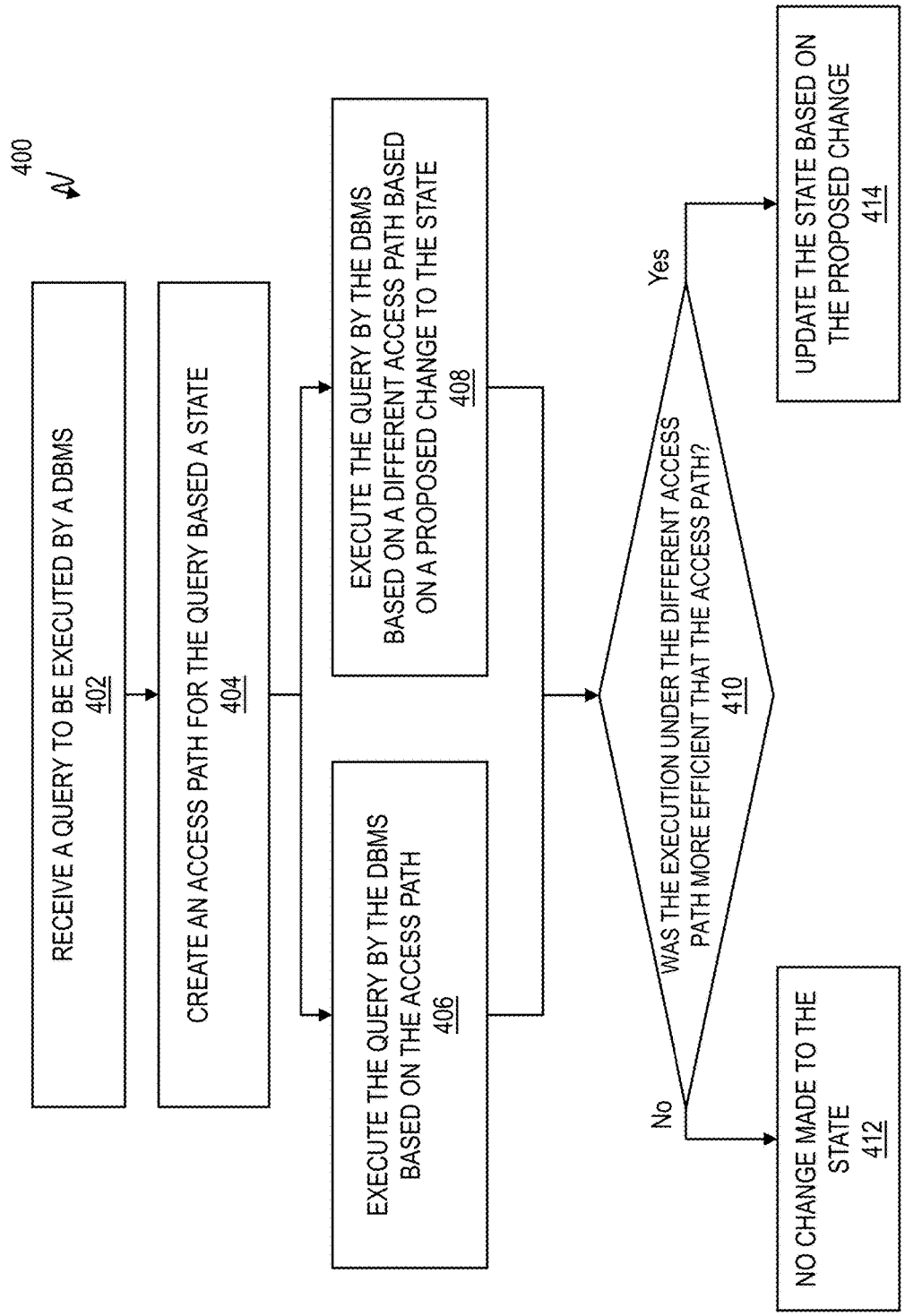
FIG. 4 is a flowchart of another method for performing query optimization by applying reinforcement learning in accordance with one or more embodiments of the present invention.

Referring now to FIG. 4, a flowchart of another method 400 for performing query optimization by applying reinforcement learning (RL) in accordance with one or more embodiments of the present invention is shown. The method 400 includes receiving a query to be executed by a databased management system (DMBS). Next, as shown at block 404, the method 400 includes creating an access path for the query based on a state. In exemplary embodiments, the state includes one or more inputs and assumptions regarding the database managed by the DBMS. The method 400 also includes executing the query by the DMBS based on the access path, as shown at block 406. The method 400 also includes executing the query by the DBMS based on a different access path based on a proposed change to the state, as shown at block 408.

As shown at decision block 410, the method 400 includes determining whether the execution of the query under the different access path was more efficient that the access path, i.e., was the query able to be processed faster under the different access path than the access path. If the execution of the query under the different access path was more efficient that the access path, the method 400 proceeds to block 414 and includes updating the state based on the proposed change. Otherwise, the method 400 proceeds to block 412 and no change made to the state.

Figure 5:
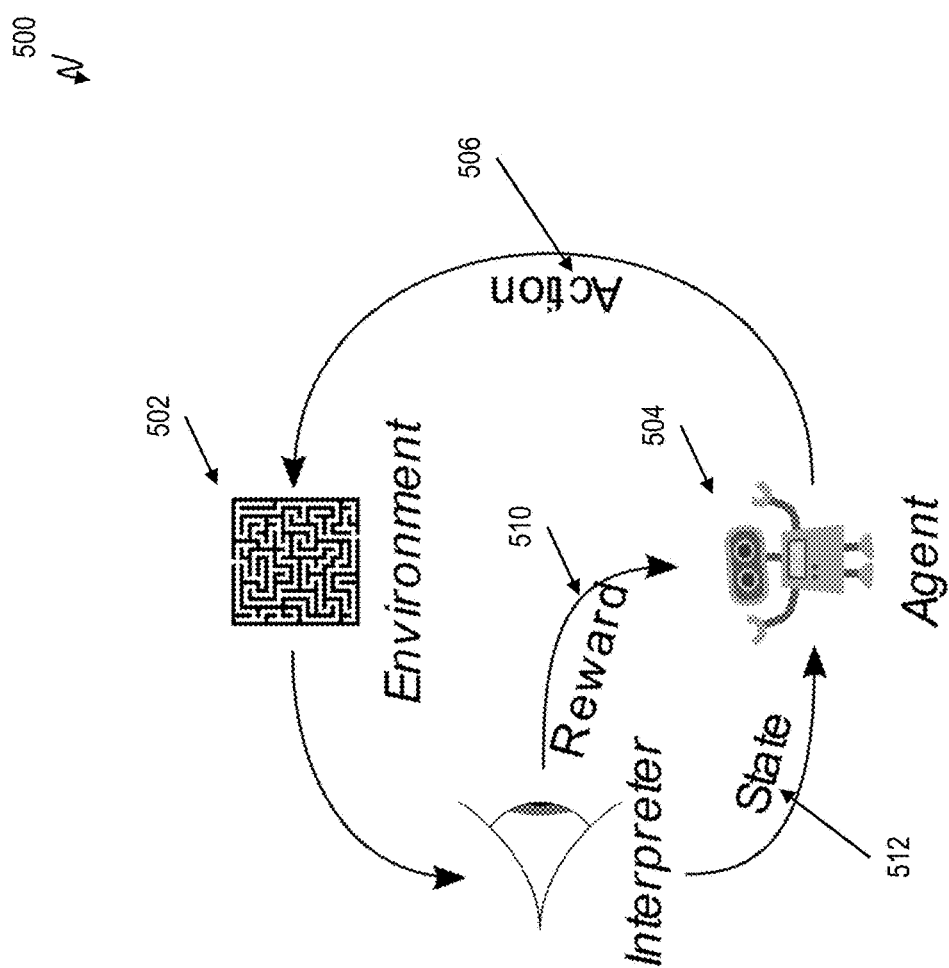
FIG. 5 is a schematic diagram of a system for performing query optimization by applying reinforcement learning in accordance with one or more embodiments of the present invention.

Referring now to FIG. 5, a schematic diagram of a system 500 for performing query optimization by applying reinforcement learning in accordance with one or more embodiments of the present invention is shown. The environment 502 is the query optimizer, which selects the best access path based on given inputs, adding a new input from the agent 504 that instructs the query optimizer as to how the access path should be modified. In exemplary embodiments, the agent 504 is a daemon process that runs automatically and periodically observes queries running on the DBMS. The daemon process will analyze the current state of those queries and determine the most rewarding action 506 (if any). For each statement, the state 512 is the current query execution plan. This includes all of the individual choices that define the current access path. The set of actions 506 that the agent 504 can determine involve modifications to the current query execution plan. For example, one possible action would be to modify the current access path to use a non-Pipeline plan instead of a Pipeline plan, or vice versa.

In exemplary embodiments, the goal of the agent 504 is to optimize the performance of each statement it processes. This can be measured using one or more metrics based on what is determined to be the most critical for a given statement. For example, some statements may be optimized to reduce CPU usage and elapsed time, while others may be optimized for concurrency. Based on the selected performance metric for a given statement, a set of logic is defined that drives the selection of an alternative execution plan. Upon subsequent execution of the statement, the new performance can be measured, and it can be determined whether the selected action was a step toward the goal of optimal performance, or a step away from that goal.

Given this set of definitions, an objective function is defined as the sum of the reward 510 over time. At each time, the agent 504 will select an action 506 that changes the current access path, measure the new performance based on the selected metric and gradually learn to favor actions that lead to improved performance over time. The longer the agent runs, the better it gets at selecting actions for optimal performance, without requiring user intervention.

In one example, using Db2 for z/OS and its cost-based query optimizer as an example, a query with the 'FETCH FIRST N ROWS ONLY' clause enters the reinforcement learning cycle when the Db2 query optimizer recognizes it needs additional information to properly choose between a pipeline plan and a non-pipeline plan. It indicates this by recording that state of this query is a system table. The state includes of both the selected access path and the question that need to be answered by the agent, pipeline or non-pipeline, When the agent sees this query and its current state and other execution details, eyeing for the best reward, it may choose to switch to an alternative plan. For example, switch from a pipeline plan to a non-pipeline plan. That action is then sent back to Db2 and the query optimizer. Coming out of Db2 again, the query will carry a new state which is a non-pipeline plan. Then the agent will take action based upon that new state and execution details but considering the history of prior state and actions that have already been taken. At any time, the agent may take an action to lock in either the current access path or a prior access path when it deems that access path the optimal choice. That will end the process of reinforcement learning for that SQL.

Technical advantages and benefits include a query optimization method that does not rely on updating or maintaining cost models and that is configured to iteratively improve the query performance by using reinforcement learning.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method to improve query performance in a database management system (DBMS), the method comprising:
   receiving, by a query optimizer of the DMBS, a query for execution;
   creating, by the query optimizer, an initial access path for the query based on a current state of a database of the DBMS;
   executing the query based on the initial access path;
   observing, by a query agent of the DBMS, the execution of the query, wherein the query agent analyzes the current state and based on the current state, determines a rewarding action from a set of actions to determine a change to the initial access path for the query;
   based on a determination by the query agent that the change to the initial access path would improve the execution of the query, modifying the current state,
   wherein the determination by the query agent that the change to the initial access path would improve the execution of the query is based on the query agent performing the query according to a second access path that is different from the initial access path.

2. The computer-implemented method of claim 1, wherein the modifying at least one of the state causes the query optimizer to create an access path different from the initial access path for a subsequent execution of the query.

3. The computer-implemented method of claim 1, wherein the modifications to the at least one of the state are determined based on the second access path.

4. The computer-implemented method of claim 1, further comprising:
   calculating an improvement score based on a difference between the execution of the query based on the initial access path and the execution of the query based on the second access path.

5. The computer-implemented method of claim 4, wherein the determination that the change to the initial access path would improve the execution of the query is based on the improvement score exceeding a threshold value.

6. The computer-implemented method of claim 1, further comprising:
   receiving, by the query optimizer of the DMBS, a second query for execution;
   creating, by the query optimizer, an access path for the second query based on the modified state;
   executing, by the DMBS, the query based on the access path;
   observing, by the query agent of the DBMS, the execution of the second query;
   based on a determination by the query agent that a change to the access path would improve the execution of the query, modifying at least one of the modified state.

7. A system comprising:
   a memory having computer readable instructions; and
   one or more processors for executing the computer readable instructions, the computer readable instructions controlling the one or more processors to perform operations comprising:
   receiving, by a query optimizer of a database management system (DBMS), a query for execution;
   creating, by the query optimizer, an initial access path for the query based on a current state of a database of the DBMS;
   executing the query based on the initial access path;
   observing, by a query agent of the DBMS, the execution of the query, wherein the query agent analyzes the current state and based on the current state, determines a rewarding action from a set of actions to determine a change to the initial access path for the query;
   based on a determination by the query agent that the change to the initial access path would improve the execution of the query, modifying the current state,
   wherein the determination by the query agent that the change to the initial access path would improve the execution of the query is based on the query agent performing the query according to a second access path that is different from the initial access path.

8. The system of claim 7, wherein the modifying at least one of the state causes the query optimizer to create an access path different from the initial access path for a subsequent execution of the query.

9. The system of claim 7, wherein the modifications to the at least one of the state are determined based on the second access path.

10. The system of claim 7, wherein the operations further comprise:
calculating an improvement score based on a difference between the execution of the query based on the initial access path and the execution of the query based on the second access path.

11. The system of claim 10, wherein the determination that the change to the initial access path would improve the execution of the query is based on the improvement score exceeding a threshold value.

12. The system of claim 7, wherein the operations further comprise:
receiving, by the query optimizer of the DMBS, a second query for execution;
creating, by the query optimizer, an access path for the second query based on the modified state;
executing, by the DMBS, the query based on the access path;
observing, by the query agent of the DBMS, the execution of the second query;
based on a determination by the query agent that a change to the access path would improve the execution of the query, modifying at least one of the modified state.

13. A computer program product comprising a computer readable storage medium having program instructions embodied therewith, the program instructions executable by a processor to cause the processor to perform operations comprising:
receiving, by a query optimizer of a database management system (DBMS), a query for execution;
creating, by the query optimizer, an initial access path for the query based on a current state of a database of the DBMS;
executing the query based on the initial access path;
observing, by a query agent of the DBMS, the execution of the query, wherein the query agent analyzes the current state and based on the current state, determines a rewarding action from a set of actions to determine a change to the initial access path for the query;
based on a determination by the query agent that a change to the initial access path would improve the execution of the query, modifying the current state,
wherein the determination by the query agent that the change to the initial access path would improve the execution of the query is based on the query agent performing the query according to a second access path that is different from the initial access path.

14. The computer program product of claim 13, wherein the modifying at least one of the state causes the query optimizer to create an access path different from the initial access path for a subsequent execution of the query.

15. The computer program product of claim 13, wherein the operations further comprise:
receiving, by the query optimizer of the DMBS, a second query for execution;
creating, by the query optimizer, an access path for the second query based on the modified state;
executing, by the DMBS, the query based on the access path;
observing, by the query agent of the DBMS, the execution of the second query;
based on a determination by the query agent that a change to the access path would improve the execution of the query, modifying at least one of the modified state.

* * * * *